R. ELLWOOD.
DOOR HANGERS.

No. 179,408.  Patented July 4, 1876.

Witnesses  
O. W. Bond  
H. F. Burns

Inventor  
Reuben Ellwood  
per West & Bond Attorneys

UNITED STATES PATENT OFFICE.

REUBEN ELLWOOD, OF SYCAMORE, ILLINOIS.

IMPROVEMENT IN DOOR-HANGERS.

Specification forming part of Letters Patent No. 179,408, dated July 4, 1876; application filed March 25, 1876.

*To all whom it may concern:*

Be it known that I, REUBEN ELLWOOD, of Sycamore, De Kalb county, State of Illinois, have invented a new and useful Improvement in Door-Hangers, of which the following is a full description, reference being had to the accompanying drawings, in which—

Figure 1:
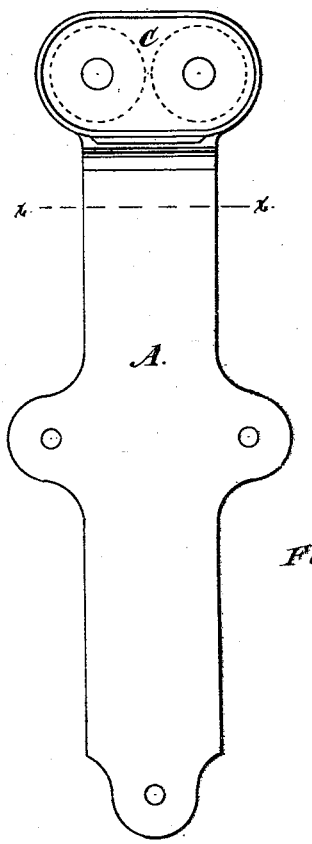
Figure 2:
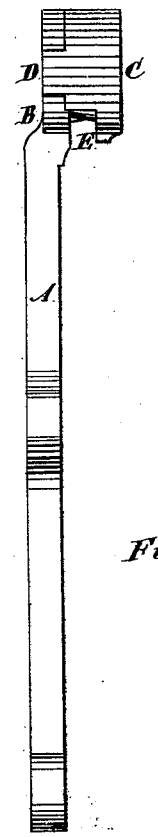
Figure 3:
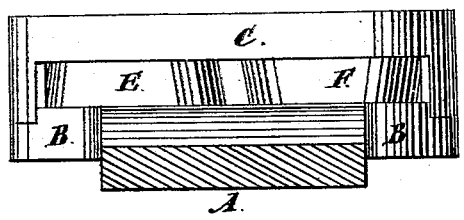
Figure 4:
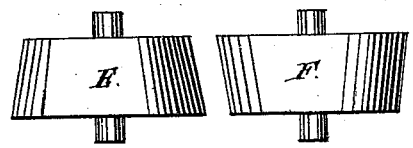

Figure 1 is a front elevation; Fig. 2, a side elevation; Fig. 3, a section on line $x\ x$ of Fig. 1, and Fig. 4 view of rollers or wheels detached.

The object of this invention is to construct a door-hanger that will be strong, durable, cheap, and easily constructed, and one which will keep the track and pass over joints without difficulty or sticking; and its nature consists in forming an elongated cap-piece, and providing it with two conical traveling wheels, and inserting the wheels at opposite angles in reverse position, as will be hereinafter more fully described and definitely claimed.

In the drawings, A represents the shaft; B, the head; C, cap; D, lugs on cap; and E F the wheels. The shank is made of any suitable size, and is provided with holes for screwing it or otherwise fastening it to the door. I usually make it of cast or malleable cast-iron, and cast the head B in one piece with it. The head is provided with recesses to receive the lugs D of the cap, and with holes for the spindles or bearings of the wheels. The elongated cap C is cast with a sufficient recess to receive the wheels, and with openings for the wheel spindles or bearings. The cap is held in place by the lugs D, and by riveting or heading the spindles of the wheels. The wheels E F are made slightly conical, and when put in place the cones are reversed, as shown.

This construction of the wheels keeps them on the track, and by using two wheels the track may be jointed, and the hanger will pass over the joint or nail or bolt holes without jumping or sticking, and the two wheels operate without binding, as one corrects the other.

What I claim as new, and desire to secure by Letters Patent, is—

The shank or bar A B, and elongated cap C, in combination with the two conical wheels E F, journaled therein in reversed position, substantially as and for the purpose specified.

REUBEN ELLWOOD.

Witnesses:
H. M. AVERY,
G. B. WISEMAN.